United States Patent Office 3,422,249
Patented Jan. 14, 1969

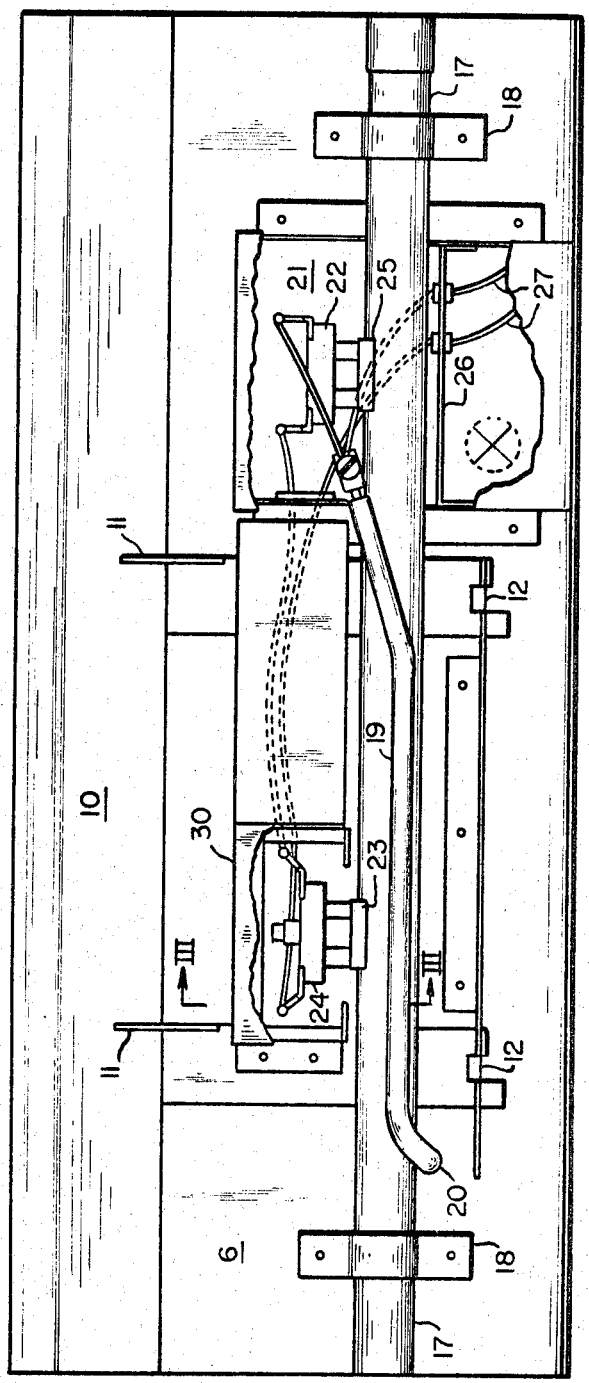

3,422,249
SAFETY DEVICE FOR AN ELECTRIC HOT WATER BASEBOARD
John S. Grossinger, Chicago, Ill., assignor to Crane Company, Chicago, Ill., a corporation of Illinois
Filed Apr. 13, 1965, Ser. No. 447,842
U.S. Cl. 219—341   1 Claim
Int. Cl. H05b 1/00; 3/02; 11/00; F24h 7/00

ABSTRACT OF THE DISCLOSURE

Safety arrangement for use in a hot water baseboard having a conduit and an electric heating means in heat exchange relation therewith. The safety arrangement comprising an automatic thermostatic switch mounted on the conduit downstream from the heating means and a manually reset thermostat mounted on the conduit adjacent the heating means. Said switch and said thermostat being connected in series with said heating means to interrupt current flow to said heating means upon sensing a predetermined temperature. The manually reset thermostat is mounted on a metal plate in direct contact with a portion of the conduit and the heating means.

---

This application relates to a safety device for an electric hot water baseboard, particularly a safety device for a baseboard heating system such as is shown in my copending application Ser. No. 449,353 filed Mar. 10, 1965, now Patent No. 3,261,964. In my copending application Ser. No. 449,353, I describe a hydronic heating system of the baseboard type in which enclosures extending along the walls and floors of rooms to be heated constitute baseboards for the walls. A conduit extending through all of the enclosures carries all of the fluid which is circulated through the system. Heating units are mounted within the enclosures and on the conduit at intervals along its length and heat fluid in the conduit. Heat distributing units also mounted on the conduit and within the enclosures but spaced from the heating units distribute heat from fluid in the conduit into the air in the rooms in which they are located.

Each heating unit includes an electric resistance heating element which is brazed onto the conduit so that the heating element is in heat exchange relationship with water in the conduit. The baseboard enclosure for the heating units has openings above and below the electric resistance elements for the flow of air upwardly through the enclosure around the heating elements and some of the heat developed by the electric resistance elements is transferred to the air which carries it out into the room where the heating unit is positioned. However, most of the heat developed by the resistance heating elements is transferred to the fluid in the conduit by conduction.

The heat distributing units comprise fins soldered onto the conduit and spaced from each other a short distance along a length of the conduit. The enclosures for the heat distributing units have openings above and below the fins and air passing up through the heat distributing unit and through the fins is heated by heat transferred from the hot water in the conduit to the fins and from the fins to the air, and the heated air passes out into the rooms in which the heat distributing units are positioned.

Each heating unit also has a thermostatic safety switch mounted on the conduit downstream of the electric resistance heating element and in heat exchange relationship with the conduit. These safety switches are connected in series with the electric resistance heating elements and cut off the supply of electricity to these elements when the water reaches a predetermined temperature above the normal operating temperature of the water in the conduit. These safety switches are automatic so that when the temperature of the water drops below normal operating temperatures, the switch is closed and electricity is again supplied to the electric resistance heating element.

The protection provided by the safety switch is satisfactory so long as there is a full flow of water in the conduit and the overheating of the water is caused by temporarily diminished heat transfer to the air. However, if the pump which circulates water through the conduit should fail, if there should be a leak in the conduit, or if for some reason there is no water in the conduit, the safety switch will not protect the heating unit satisfactorily, and particularly the electric resistance heating element, because of cycling of the safety switch. Thus, the safety switch will cut out the current when a predetermined high temperature is reached, but it will also turn on the current again upon return to a predetermined water temperature below normal operating temperature, and this on and off operation of the resistance heating element without sufficient water in the conduit will damage and eventually burn out the heating element. Also, because the safety switch is located a distance from the heating element, much higher temperatures are reached at the heating element and adjoining parts than temperatures reached at the switch when there is insufficient water in the conduit, thus creating potential fire hazards at the heating elements.

In accordance with this present invention, I provide a safety device to take care of the situation when there is insufficient water circulating in the conduit. The safety device includes, in addition to the automatic thermostatic safety switch described above, a manually reset thermostat positioned in heat exchange relationship with a portion of the conduit on which the electric resistance heating element is secured. Since the resistance element is brazed onto the conduit, the manually reset thermostat is also in heat exchange relationship with the resistance element. This thermostat will automatically open when the conduit and resistance element reach a predetermined temperature, but a manual operation is required to close the thermostat and restore the supply of electric current to the resistance element.

The electric resistance element, the automatic safety thermostat, and the manually reset thermostat are all connected in series to a source of electric power. The manually reset thermostat is set to open at a temperature above the temperature at which the automatic safety switch is set to open, and, therefore, the safety switch will control the supply of current to the resistance element during normal operation and open in the event of a temperary decrease in the transfer of heat to the air. When there is insufficient water in the conduit or insufficient circulation of water, the electric resistance heating element and the portion of the conduit adjacent this heating element which is also the location of the manually reset thermostat will rise in temperature to the point at which the manual reset thermostat is set to open, either immediately in the case of high output heating elements, or after two or three cycles of the automatic switch in the case of low output heating elements. Thereafter, the circuit can be restored only by manual resetting of the manual reset thermostat after the cause of the overheating has been determined.

In the accompanying drawings there are illustrated certain presently preferred embodiments of my invention in which:

FIGURE 2 is a front view of the heating unit shown in FIGURE 1 but with the front panel removed and with portions of enclosures within the unit broken away;

Figure 1:
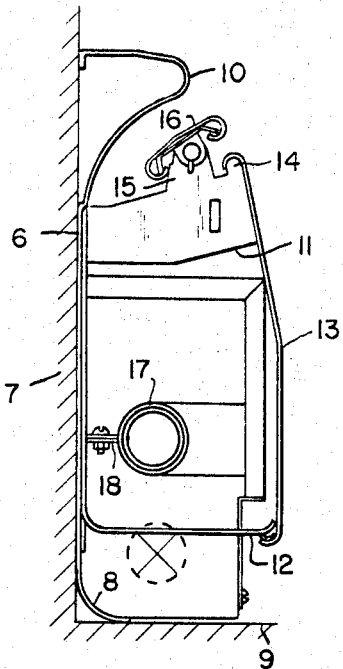
FIGURE 1 is an end view of a heating unit in which my safety device is installed.

Referring to FIGURE 1, the enclosure for the heating unit comprises a back panel 6 secured to the wall 7 of a room adjacent the floor and has a lower curved portion 8 which abuts the floor 9 and an upper inwardly curved portion 10 which deflects currents of air rising through the enclosure into the room in which the heating unit is placed. Extending from the back panel 6 are hanger brackets 11 and 12 which support a front panel 13 and other parts of the heating unit. The upper edge of the front panel 13 is curved to fit over a projection 14 on the upper bracket 11 and the lower edge of the panel is also curved inwardly to snap under the lower bracket 12.

A second projection 15 extends upwardly from the bracket 14 and carries a damper 16 which is permanently fixed in the position shown in FIGURE 1 to deflect air rising between the panels 6 and 13 outwardly into the room.

As shown in FIGURE 2, a conduit 17 for the flow of heated water through the heating unit extends through the enclosure and is supported by split brackets 18 which are mounted on the back panel 6.

The conduit 17 carries an electric resistance heating element 19 which extends along a length of the conduit 17, passes under the conduit as at 20 and then returns along the other side of the conduit 17. The ends of the heating element extend into a sheet metal junction box 21 where they are connected to an automatic thermostatic safety switch 22.

Figure 3:
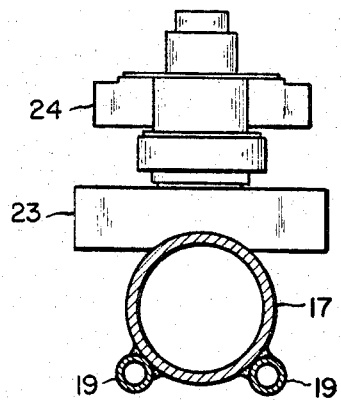
FIGURE 3 is a section along the lines III—III of FIGURE 2, but on a larger scale.

The electric resistance heating element 19 comprises a copper tube within which is a nickel chromium resistance wire separated from the inside surface of the tube by a dielectric material having high thermal conductivity such as magnesium oxide. The magnesium oxide conducts heat generated by the resistance wire to the copper tube and at the same time electrically insulates the resistance wire from the inside surface of the copper tube. As shown in FIGURE 3, the outer copper tube of the heating element is held in intimate contact with the outer surface of the conduit 17 by soldering or brazing, thus forming in effect a solid metal wall between the interior of the heating element and the interior of the conduit 17.

A copper plate 23 is machined to fit the conduit 17 and is soldered to the conduit so as to provide maximum heat exchange between the plate 23 and the conduit 17. Since the electric resistance heating element 19 is brazed or soldered to the conduit, the plate 23 is also in heat exchange relationship with the heating element. A manually reset thermostat 24 is mounted on the plate 23 and through the plate 23 is in heat exchange relation with the conduit 17 and the heating element 19.

A second copper plate 25 is machined to fit the conduit 17 and is soldered to the conduit to establish a good heat exchange relationship between the plate and the conduit. The plate 25 carries the automatic thermostatic safety switch 22 and brings the switch in heat exchange relationship with the conduit 17.

Figure 4:
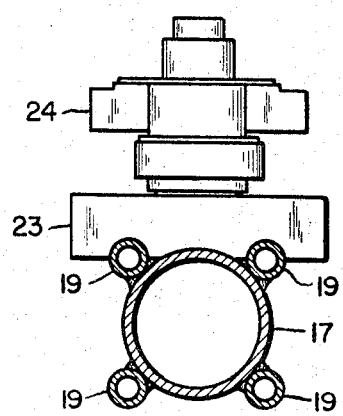
FIGURE 4 is a section similar to FIGURE 3 but showing a modified form of heating element used in the heating unit.

Instead of a single electric resistance heating element 19, there may be two such elements, the second element extending along the conduit 17 above the element 19 and being passed over the conduit 17 in the same manner that the resistance element 19 is passed under the conduit as shown at 20 in FIGURE 2. Alternatively, as shown in my copending application Ser. No. 449,353 a single resistance element may have four lengths which extend along the conduit 17. In both of these cases, the plate 23 for the manual reset thermostat 24 is mounted directly upon the electric resistance heating elements as shown in FIGURE 4.

As described above, the automatic thermostatic safety switch 22 and the ends of the electric resistance heating element are mounted within a sheet metal junction box 21. To achieve maximum compactness this box is located between front panel 13 and back panel 6 and has a horizontal partition 26 beneath the conduit 17 providing a compartment of relatively low temperature which acts as an outlet box into which electric leads 27 extends for connection to a source of electric power and a wall thermostat in the usual manner.

Figure 5:
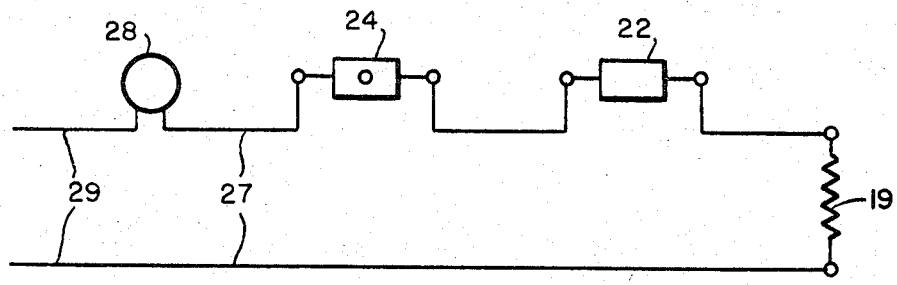
FIGURE 5 is an electrical diagram showing the electrical circuit for my safety device.

FIGURE 5 is an electrical diagram showing the electrical connections between the heating element 19, the automatic thermostatic safety switch 22, the manually reset thermostat 24, a room wall thermostat 28, and a source of power 29. As shown in FIGURE 5, all of these instrumentalities are connected in series to the source of power.

As noted above, the automatic thermostat safety switch 22 is enclosed within a sheet metal junction box 21. The manually reset thermostat 24 is also enclosed in a sheet metal box 30. Both of the enclosures are provided to shield the electrical connections from heat created within the electric resistance heating element 19. It should, however, be noted that the manual reset thermostat is in intimate contact with that portion of the conduit 17 which carries the resistance heating element 19 and is responsive to the temperature of the resistance heating element 19 and the portions of the conduit 17 which are adjacent thereto. On the other hand, the automatic thermostat safety switch 22 is positioned downstream of the heating element and is responsive primarily to temperature of the water within the conduit 17.

Both the manual reset thermostat 24 and the automatic thermostat safety switch 22 are commercially available, temperature responsive control devices. The manually reset thermostat 24 is normally closed and opens to break an electric circuit when the heating unit parts with which it is associated reach a predetermined temperature. It can be closed to complete an electric circuit only by a manual operation. The automatic safety switch is closed in normal operation and opens to break an electric circuit when the heating unit parts with which it is associated reach a predetermined temperature. When the switch has opened upon the reaching of a predetermined temperature, the parts with which it is associated will cool and when they again reach a predetermined temperature below the normal operating temperature, the switch will automatically close. Thus, the switch cycles between on and off positions depending upon the temperature of the parts with which it is associated, said temperature corresponding very closely to the temperature of the water leaving the heating unit.

In the operation of my safety device, the manual reset thermostat 24 is set to open at a temperature higher than the temperature at which the automatic safety switch 22 is set to open. Therefore, in the normal operation of the heating unit, the automatic safety switch 22 will control the supply of current to the heating element 19 since, as was explained with reference to FIGURE 5, all of the parts are connected in series. If there is sufficient water flow in the conduit 17 and there is temporary overheating within the electric heating unit because of temporarily diminished transfer of heat from the water to the air, the thermostatic switch 22 will open and cut out the circuit. Upon cooling, the switch will close and the supply of current will resume. If, however, there is insufficient water flow in the conduit 17 because the water circulating pump fails, because there is an air block in the conduit, because there is a water leak in the system, or if through carelessness the heating elements have been energized before water was placed in the system, the portion of the conduit and the heating element adjacent the manually reset thermostat 24 will heat up much more rapidly than the portion of the conduit adjacent the automatic safety switch 22 so that the manual reset thermostat 24 will control the circuit and will open when the parts with which it is associated reach the predetermined temperature for which the thermostat was set to open before the automatic switch 22 reaches the temperature at which it was set to open. Since the thermostat 24 is a manual reset thermostat, the switch will stay open until it is manually closed after the cause of overheating has been determined and eliminated.

If there is some flow of water in the conduit 17 but not sufficient to prevent overheating of the heating element and if the heating element is a low output element, the automatic switch 22 may open in advance of the manual reset switch 24. Upon cooling, it will then close as described above. However, due to the excess heat that changes the pattern of the temperature distribution, after two or three of these cycles, the metal member 23 will reach the temperature at which reset switch 24 has been set to open and thereby the supply of current to the electric resistance heating element is cut off until the switch 24 is manually reset.

From the foregoing it is apparent that my safety device provides the conventional controls for the prevention of overheating of a baseboard heating unit in normal operation. It also protects the heating element and other parts of the heating unit from destruction in the event that abnormal conditions should occur, such as a leak in the conduit for the flow of water through the system, failure of the water circulating pump, etc. It will also prevent the development of such high temperatures in the heating unit as may be a fire hazard.

While I have described certain presently preferred embodiments of my invention, it is to be understood that it may be otherwise variously embodied within the scope of the appended claims.

I claim:

1. In a hot water baseboard having a conduit for the flow of water and an electric heating means mounted on and in heat exchange relation with a portion of said conduit; the improvement comprising a safety device, said safety device including:
   (A) an automatic thermostatic switch mounted in heat exchange relationship with said conduit and spaced downstream from said heating means,
   (B) a manual reset thermostat mounted on a metal plate, said metal plate being in contact with said portion of said conduit and said heating means, and
   (C) an electric circuit operatively connecting said thermostatic switch, said thermostat and said heating means in series, said switch being normally closed and set to open when the temperature of said conduit rises to a predetermined point and to close when the temperature of said conduit falls below operating temperature, said thermostat being normally closed and set to open when the temperature of the portion of said conduit in heat exchange relationship with said heating means rises to a predetermined temperature.

References Cited

UNITED STATES PATENTS

| | | | |
|---|---|---|---|
| 2,063,152 | 12/1936 | Davidson | 219—341 |
| 2,080,798 | 5/1937 | Wiegand | 219—365 X |
| 2,088,728 | 8/1937 | Stranszky | 219—330 |
| 2,578,819 | 12/1951 | Mast et al. | 219—368 X |
| 2,745,941 | 5/1956 | McElhaney | 219—306 X |
| 3,261,964 | 7/1966 | Grossinger | 219—341 X |
| 2,538,080 | 1/1951 | Bolesky | 200—138 |
| 3,254,796 | 6/1966 | Wright | 219—330 |

FOREIGN PATENTS 220,834   2/1959   Australia.

ANTHONY BARTIS, *Primary Examiner.*

U.S. Cl. X.R.
237—16; 236—21; 219—364, 330, 301